Sept. 19, 1939.                M. R. LIEB ET AL                2,173,210
                            VALVE OPERATING MEANS
                       Filed June 22, 1938        2 Sheets-Sheet 1
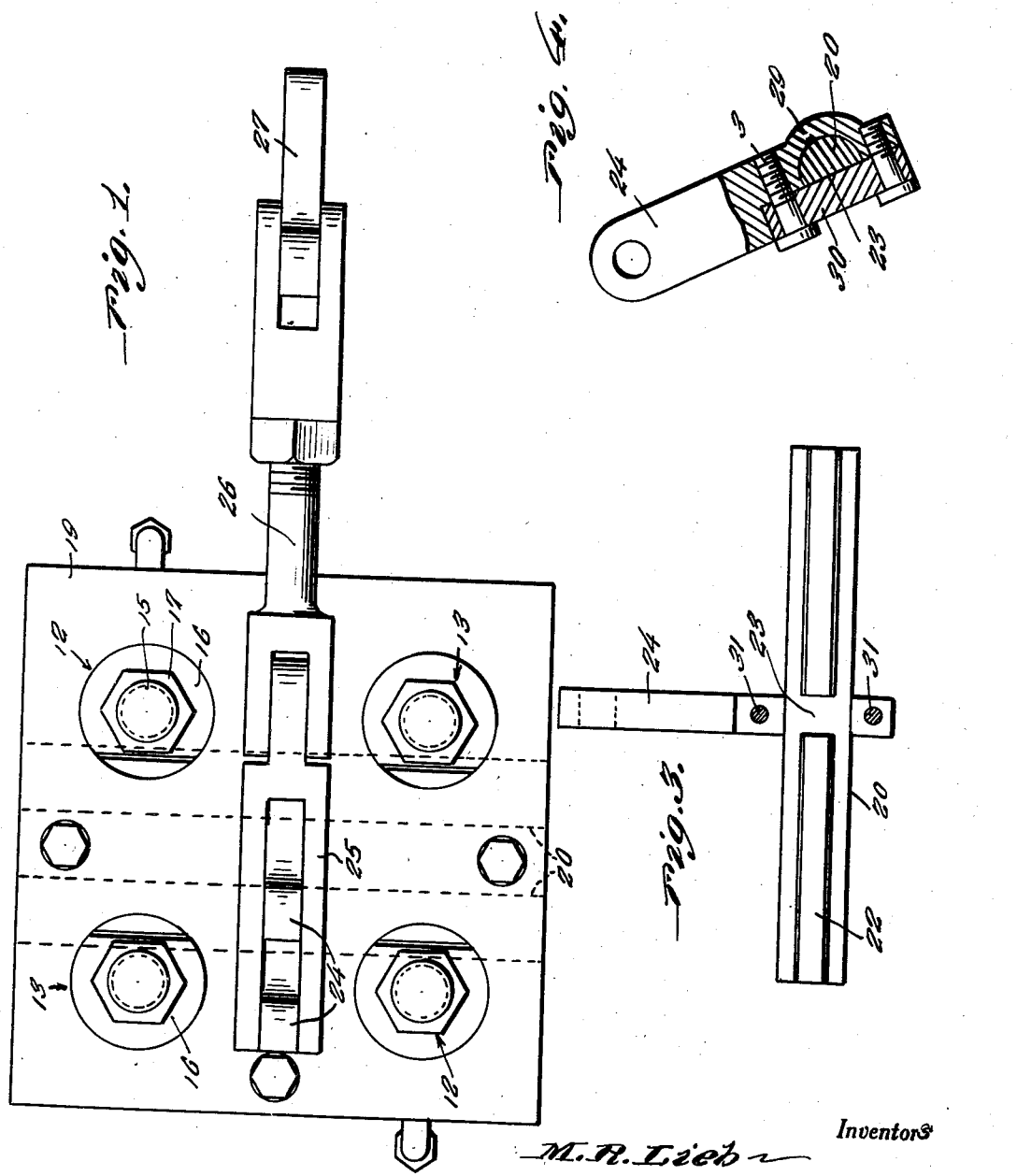

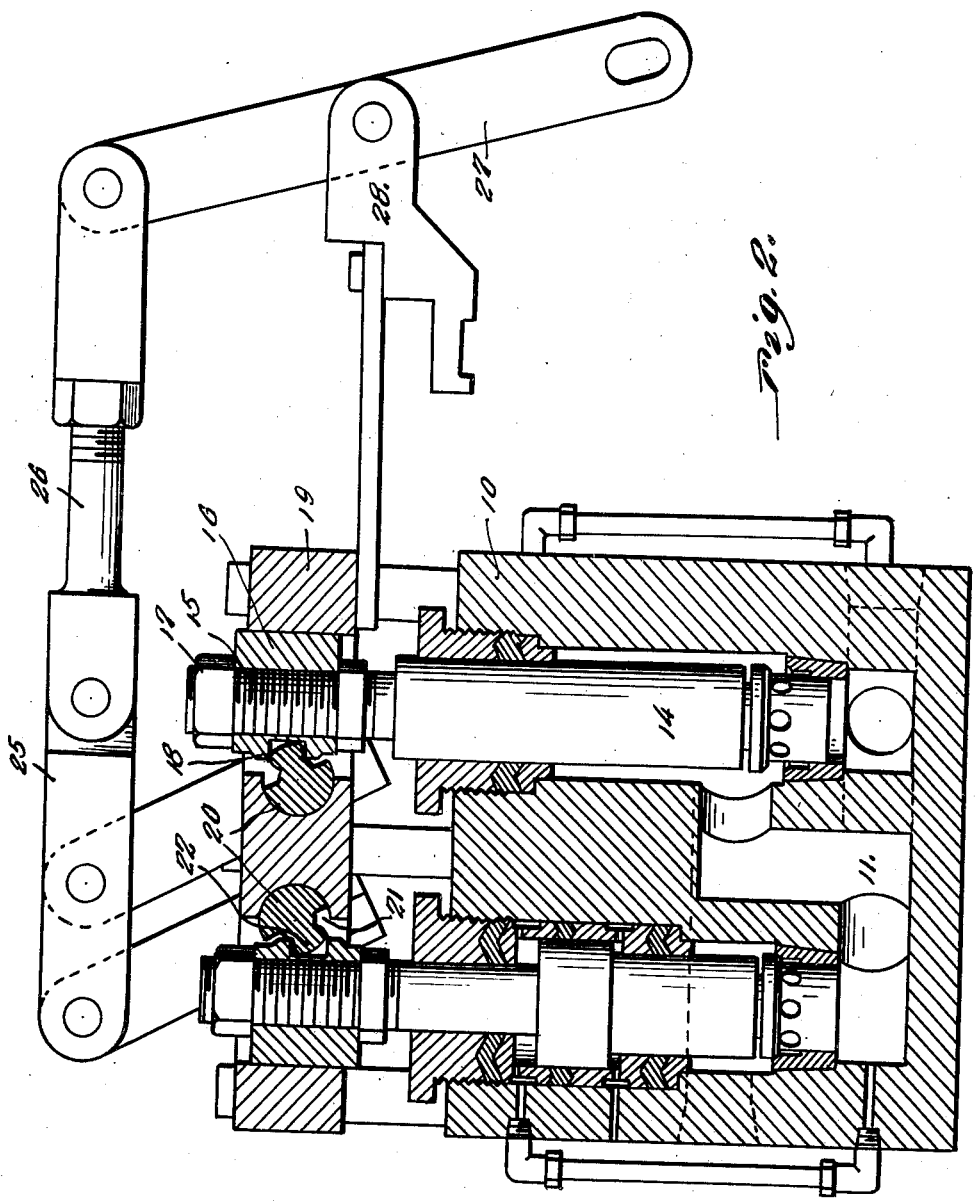

Patented Sept. 19, 1939

2,173,210

UNITED STATES PATENT OFFICE 2,173,210

VALVE OPERATING MEANS

Merril R. Lieb, Allentown, and Walter W. Wassum, Alburtis, Pa.

Application June 22, 1938, Serial No. 215,245

2 Claims. (Cl. 277—13)

This invention relates to an operating means for a valve of the character forming the subject matter of a copending application, wherein slidable valve elements are employed and arranged to provide a pair of pressure control or inlet valves diagonally arranged to each other and adapted to alternatingly operate with respect to one another and a pair of exhaust valves similarly moved and arranged to said inlet valves, and has for the primary object the provision of a device of this character which will efficiently operate the inlet and exhaust valves simultaneously and in their proper sequence through the movement of a single operating medium and consists of a construction which is simple to assemble and take apart and is compact, durable and efficient and which may be manufactured and sold at a low cost.

With these and other objects in view, the invention consists in certain novel features of construction, combination and arrangement of parts to be hereinafter more fully described and claimed.

For a complete understanding of our invention, reference is to be had to the following description and accompanying drawings, in which Figure 1 is a top plan view illustrating a valve operating means constructed in accordance with our invention.

Figure 2 is a vertical sectional view showing the operating means associated with a pair of the valve elements of the valve.

Figure 3 is a plan view, partly in section, illustrating one of the toothed shafts.

Figure 4 is a fragmentary transverse sectional view showing the connection between the shaft arm and one of the shafts.

The type of valve which the operating means forming the subject matter of the present invention is used on is only shown generally in the drawings and consists of a body 10 having a series of passages designated by the character 11 controlled by pressure or inlet valves and exhaust valves 13, each including a slidable valve element 14 having at its upper end a screw threaded shank 15 on which is mounted a block 16 held in place by a nut 17 threaded on the portion 15. The blocks 16 form a part of the present invention. By reference to Figure 1 it will be seen that the pressure control or inlet valves are arranged in diagonal relation which also applies to the exhaust valves 13. It is further to be noted that when one of the inlet valves is open the other inlet valve is closed. This also applies to the exhaust valves. A detail description of the operation of the valve elements for the control of the ports is not thought necessary as such descriptive matter is clearly set forth in the copending application above referred to.

The blocks 16 have formed therein teeth receiving notches 18. Mounted on the body 10 of the valve is a cradle 19 which slidably supports the blocks 16 and also rotatably supports shafts 20. The shafts are cut longitudinally thereof to form spaced grooves 21 defining therebetween elongated teeth or ribs 22. The shafts 20 are further cut at right angles to the grooves 21 to provide each tooth or rib of each shaft with a clamp receiving space 23. The teeth of the shafts are received in the notches of the blocks 16 and the shafts are free to rotate in opposite directions for imparting reciprocal movement to the valve elements 14. By referring to Figure 1 it will be seen that one of the inlet valves and one of the exhaust valves are connected to one of the shafts 20
while the other inlet valve and the other exhaust valve are connected to the other shaft.

The shafts have secured thereto arms 24 and they are in turn pivotally connected to a link 25. The link 25 is pivotally connected to an adjustable connecting rod 26 and the latter is pivotally connected to one end of an operating lever 27 pivotally mounted on a bracket or support 28 carried by the cradle 19. Through pivotal movement of the operating lever 27 in opposite directions the shafts 20 will be caused to rotate in opposite directions for the purpose of imparting reciprocal movement to the valve elements 14.

Each arm 24 has formed therein a semicircular shaped recess 29 and coacting with said recess is a clamping plate 30 detachably mounted on the arm by set screws 31. The clamping plate has one end seated in a recess formed in the arm 24. The arms 24 are applied to the shafts 20 where said shafts are cut to define the spaces 23 between the teeth or ribs. The shafts seat within the recesses 29 and the clamping plates 30 engage between the adjacent ends of the ribs or teeth. The shafts are rendered semicircular in cross section where cut to form the spaces 23 so that when the clamping plates 30 are applied to the arms and fitting between the adjacent ends of the ribs or teeth the arms are locked on the shafts against rotation relative thereto and against sliding movement endwise of said shafts.

From the foregoing description taken in connection with the accompanying drawings it will be seen that through the operation of the lever 27 in one direction, one of the inlet valves will be closed and the other opened and also one of the exhaust valves will be closed while the other will be opened. A movement of the lever 27 in a reverse direction brings about reverse operation of the inlet and exhaust valves.

It is believed that the foregoing description, when taken in connection with the drawings will fully set forth the construction and advantages of this invention to those skilled in the art to which such a device relates, so that further detailed description will not be required.

Having described the invention, what we claim is:

1. In combination with a valve including reciprocal valve elements arranged in pairs, a cradle carried by said valve, an operating means mounted on said cradle for movement in opposite directions, blocks slidably mounted on said cradle and detachably secured on the valve elements and provided with notches, shafts journaled in said cradle and each provided with longitudinally and transversely extending grooves to define elongated teeth spaced from each other, said teeth received in the notches of the blocks whereby the valve elements are connected to said shafts for simultaneous operation and the movement of the valve elements of each pair in opposite directions to each other, arms pivotally connected to said operating means and having recesses to receive the shafts where transversely grooved, and clamping plates detachably secured on said arms and engaging the shafts within the transversely arranged grooves to secure the arms against rotation on the shaft and lying between the adjacent ends of the teeth to prevent the arms from sliding endwise of the shafts.

2. In combination with a valve including reciprocal valve elements arranged in pairs, a cradle carried by said valve, an operating medium mounted on said cradle for movement in opposite directions, blocks slidably mounted in said cradle and connected to said valve elements and having notches, shafts journaled in said cradle, teeth on said shafts and extending longitudinally thereof and received in the notches of the blocks whereby the valve elements may be simultaneously operated and the valve elements of each pair reversely moved to each other, arms secured on said shafts and pivotally connected to said operating medium.

MERRIL R. LIEB.
WALTER W. WASSUM.